(12) United States Patent
Roessl

(10) Patent No.: US 8,611,489 B2
(45) Date of Patent: Dec. 17, 2013

(54) SPECTRAL IMAGING

(75) Inventor: Ewald Roessl, Ellerau (DE)

(73) Assignee: Koninklijke Philips N.V., Eindhoven (NL)

( * ) Notice: Subject to any disclaimer, the term of this patent is extended or adjusted under 35 U.S.C. 154(b) by 350 days.

(21) Appl. No.: 13/128,889

(22) PCT Filed: Nov. 3, 2009

(86) PCT No.: PCT/IB2009/054884
§ 371 (c)(1),
(2), (4) Date: May 12, 2011

(87) PCT Pub. No.: WO2010/061307
PCT Pub. Date: Jun. 3, 2010

(65) Prior Publication Data
US 2011/0216878 A1   Sep. 8, 2011

Related U.S. Application Data

(60) Provisional application No. 61/117,717, filed on Nov. 25, 2008, provisional application No. 61/120,498, filed on Dec. 8, 2008.

(51) Int. Cl.
*A61B 6/00* (2006.01)
(52) U.S. Cl.
USPC .............................................................. 378/5
(58) Field of Classification Search
USPC ..................................................... 378/4–20
See application file for complete search history.

(56) References Cited

U.S. PATENT DOCUMENTS

| 2,903,591 | A | 9/1959 | Lichtenstein |
| 4,493,811 | A | 1/1985 | Seki et al. |
| 7,480,362 | B2 | 1/2009 | Carmi |
| 2008/0210877 | A1 | 9/2008 | Altman et al. |
| 2008/0283761 | A1* | 11/2008 | Robinson et al. ........ 250/370.09 |

FOREIGN PATENT DOCUMENTS

WO   2008078231 A1   7/2008

OTHER PUBLICATIONS

Thomas et al., Gamma Discrimination and Sensitivities of Averaging and RMS Type Detector Circuits for Campbelling Channels, IEEE Transactions on Nuclear Science, Feb. 1968, pp. 15-21, vol. 15, issue 1.
Hsu et al., An Analysis of the Difference Between True-Mean-Square and Average-Magnitude-Squared Detector for Circuits for Use in Campbelling Neutron Monitoring Systems, IEEE Transactions on Nuclear Science, Feb. 1970, pp. 506-509, vol. 17, issue 1.

* cited by examiner

*Primary Examiner* — Courtney Thomas

(57) ABSTRACT

A spectral processor (118) includes a first processing channel (120) that generates a first spectral signal derived from a detector signal, wherein the first spectral signal includes first spectral information about the detector signal, and a second processing channel (120) that generates a second spectral signal derived from the detector signal, wherein the second spectral signal includes second spectral information about the detector signal, wherein the first and second spectral signals are used to spectrally resolve the detector signal, and wherein the detector signal is indicative of detected polychromatic radiation.

24 Claims, 5 Drawing Sheets

SPECTRAL IMAGING

CROSS REFERENCE TO RELATED APPLICATIONS

Figure 1:
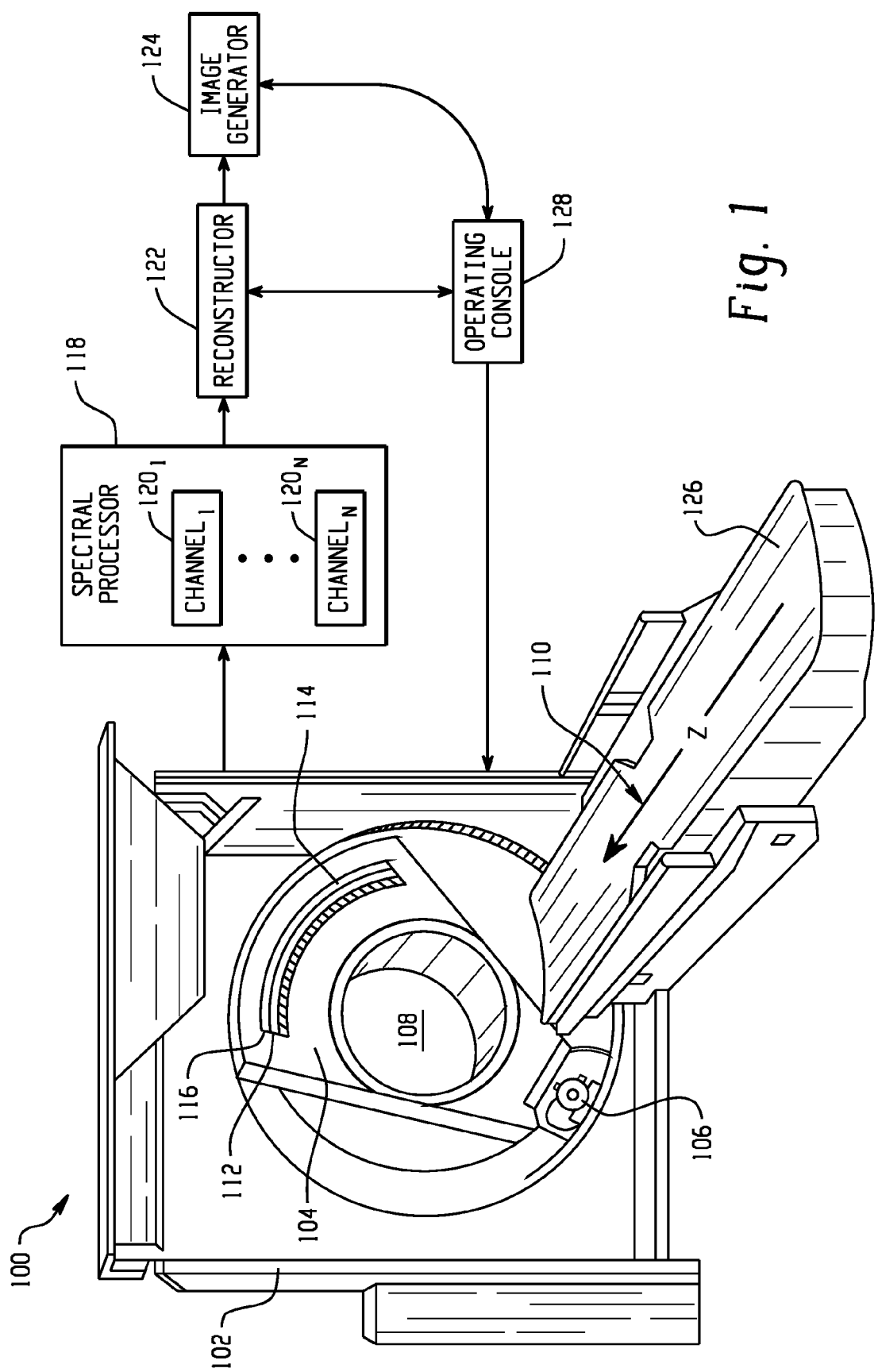

This application claims the benefit of U.S. provisional application Ser. No. 61/117,717 filed Nov. 25, 2008 and U.S. provisional application Ser. No. 61/120,498 filed Dec. 8, 2008, both of which are incorporated herein by reference.

The following generally relates to spectral imaging and finds particular application to spectral computed tomography (CT). However, it is also amenable to other medical and non-medical applications.

A conventional integrating computed tomography (CT) scanner includes an x-ray tube mounted on a rotatable gantry opposite a detector array, which includes a scintillator array optically coupled to a photosensor array. The x-ray tube rotates around an examination region and emits polychromatic radiation that traverses the examination region and a subject and/or object disposed in the examination region. The detector array receives the radiation that traverses the examination region. The scintillator array absorbs radiation and produces light indicative thereof. The light is received by the photosensor array, which converts the light into an electrical current signal indicative thereof.

The electrical current signal includes a DC component and an AC component, or fluctuations about the DC component. The magnitudes of the fluctuations are a function of the energy of the detected radiation and, thus, include spectral information. Unfortunately, in integrating mode, the electrical signal is integrated over the energy spectrum, producing a mean or average intensity value for the integration interval, and the spectral information represented by AC component is lost. The integrated signal is reconstructed, and the resulting volumetric image data can be used to generate an image of the scanned subject or object. The resulting image includes pixels that typically are represented in terms of gray scale values corresponding to relative radiodensity. Such information reflects the attenuation characteristics of the scanned subject or object.

Various techniques for deriving spectral information from integrated signals have been proposed. For example, one can make use of the fact that the absorption of radiation is dependent on photon energy. As such, one technique includes stacking rows of scintillator pixels on top of each other in the direction of the incoming radiation and providing respective photosensor pixels for each row. Generally, the lower energy photons are absorbed in the rows of scintillator pixels closer to the incoming radiation and the higher energy photons are absorbed in the rows of scintillator pixels farther from the incoming radiation.

In another instance, the tube voltage is switched between different voltages, providing one set of measurements for the lower tube voltage and another set of measurements for the higher tube voltage. In yet another instance, an imaging system is configured with multiple x-ray tubes, each being driven with a different tube voltage and, thus, multiple sets of measurements for different emission spectra are obtained. In still another instance, an energy-sensitive, photon counting detector is used providing spectral information in a certain number of energy windows. Moreover, a spectral decomposition technique has been proposed to decompose the integrated signals into photo-electric and Compton components. Where a contrast agent with a K-edge material having a known K-edge energy is used, the spectral decomposition can be extended to also provide a K-edge component.

Unfortunately, the above-noted techniques may involve adding specialized hardware and/or complexity, dealing with technological roadblocks, and/or increasing overall system cost. However, a trend in CT is to move towards higher spectral resolution since spectral imaging can provide information indicative of the elemental or material composition (e.g., atomic number) of the scanned subject or object. Thus, there is an unresolved need for efficient, novel and cost-effective spectral imaging techniques.

Present aspects of the application provide a new and improved spectral CT technique that addresses the above-referenced problems and others. In the following the term "detector signal" refers to the current signal or voltage signal or other signal indicative thereof that is produced in the detector as a result of the impact of individual detected particles.

In accordance with one aspect, a spectral processor includes a first processing channel that generates a first spectral signal derived from the detector signal, wherein the first spectral signal includes first spectral information about the detector signal, and a second processing channel that generates a second spectral signal derived from the detector signal, wherein the second spectral signal includes second spectral information about the detector signal, wherein the first and second spectral signals are used to spectrally resolve the detector signal, and wherein the detector signal is indicative of detected polychromatic radiation.

According to another aspect, a method includes detecting polychromatic radiation traversing an examination region of an imaging system, generating a detector signal indicative of the energy of the detected radiation, determining first spectral information about the incident radiation from the detector signal, determining second spectral information about the incident radiation from the detector signal, wherein the first and second spectral information is different, and spectrally resolving the detector signal based on the first and second spectral information.

According to another aspect, an imaging system includes a radiation source that emits polychromatic radiation that traverses an examination region, a detector array that detects the radiation and generates a detector signal indicative thereof, and a spectral processor that processes the detector signal. The spectral processor includes a first processing channel that generates a first spectral signal derived from the detector signal, wherein the first spectral signal includes first spectral information about the detector signal, and a second processing channel that generates a second spectral signal derived from the detector signal, wherein the second spectral signal includes second spectral information about the detector signal. The first and second spectral signals are used to spectrally resolve the detector signal.

The invention may take form in various components and arrangements of components, and in various steps and arrangements of steps. The drawings are only for purposes of illustrating the preferred embodiments and are not to be construed as limiting the invention.

Figure 2:
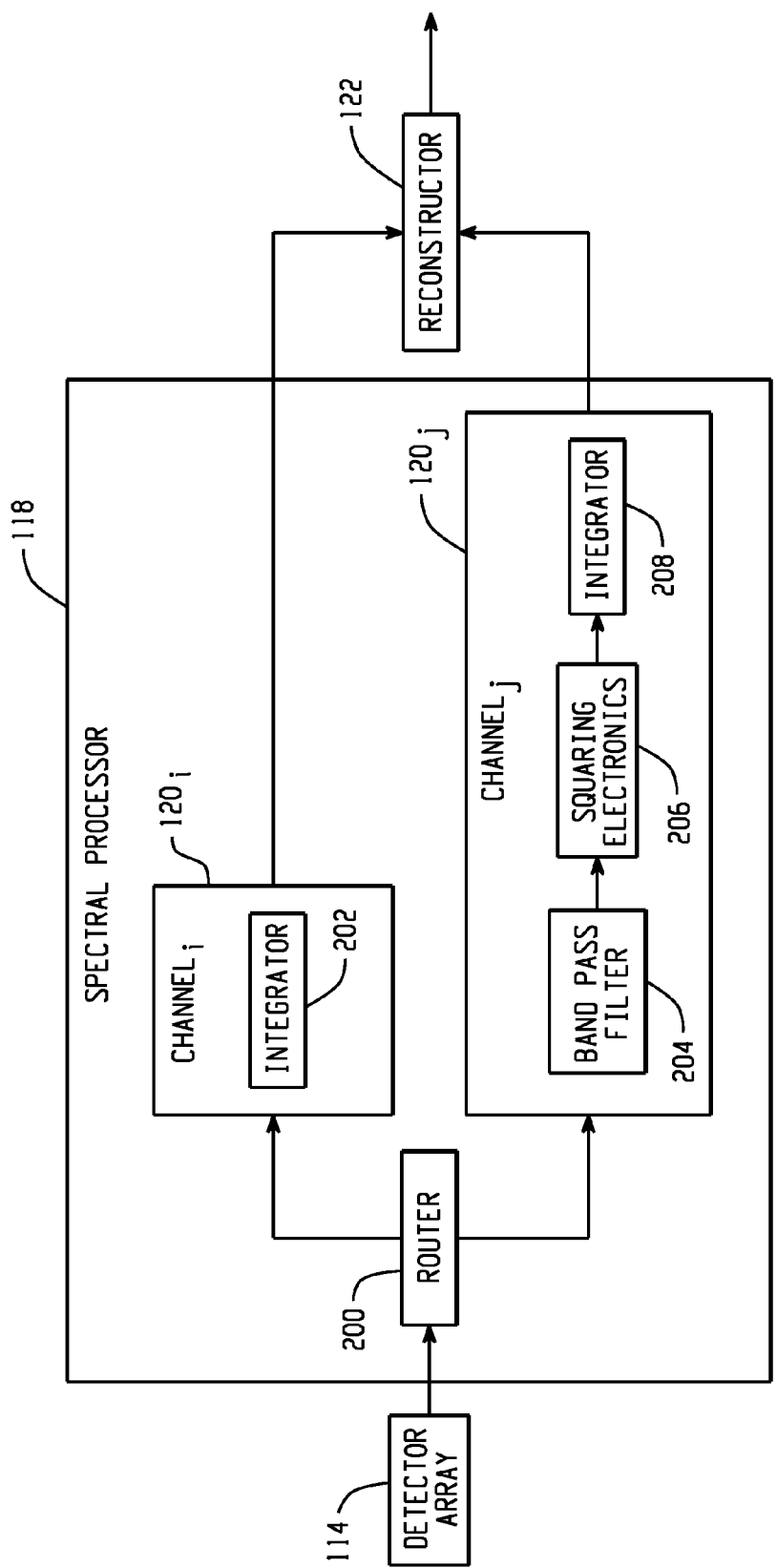
Figure 3:
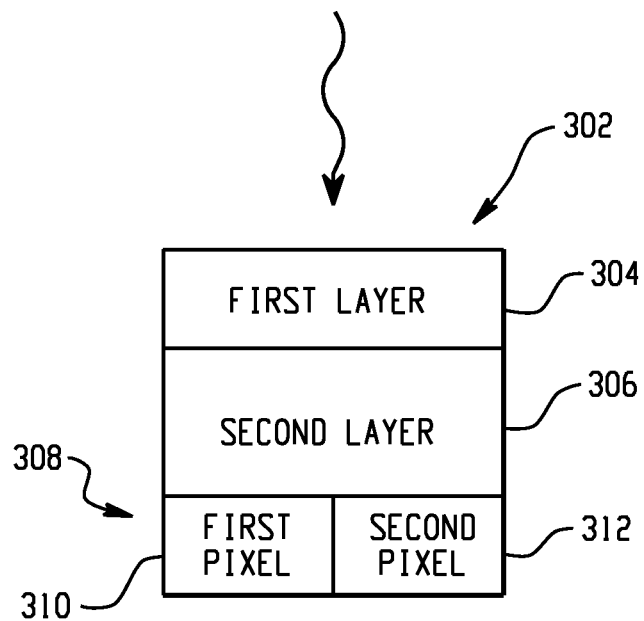
Figure 4:
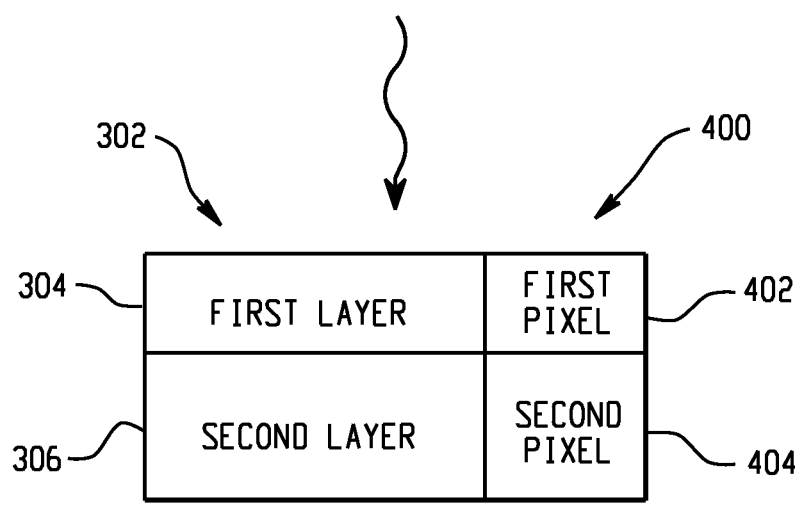
Figure 5:
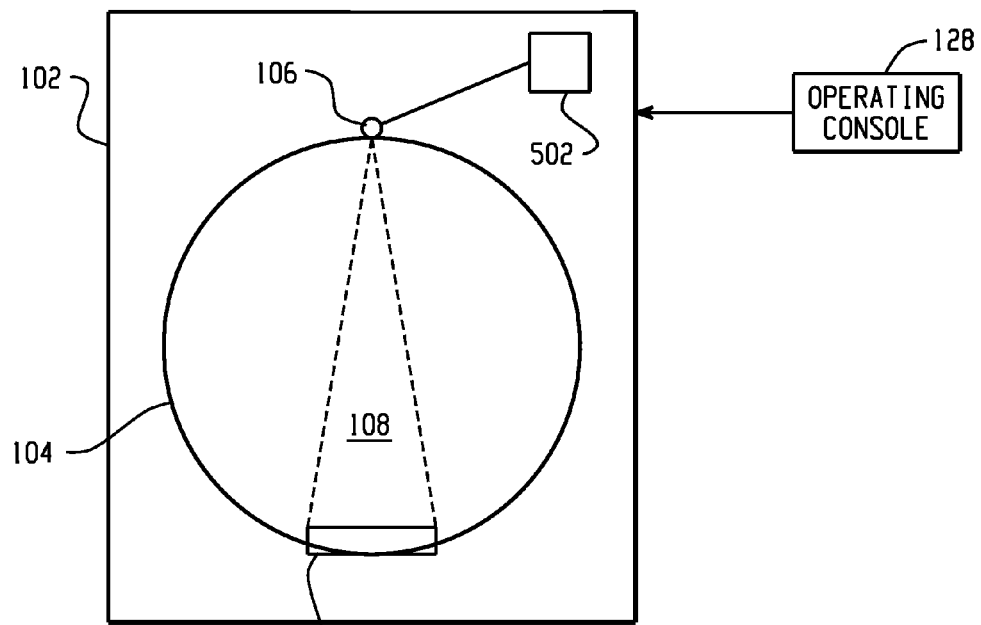
Figure 6:
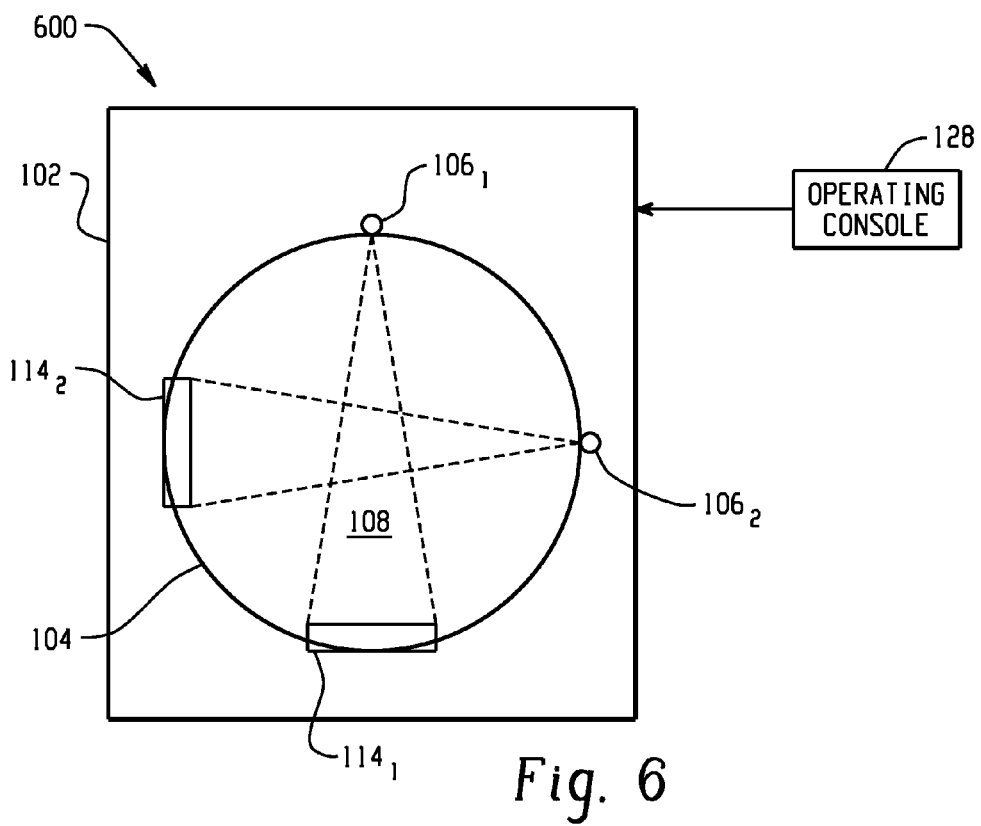
Figure 7:
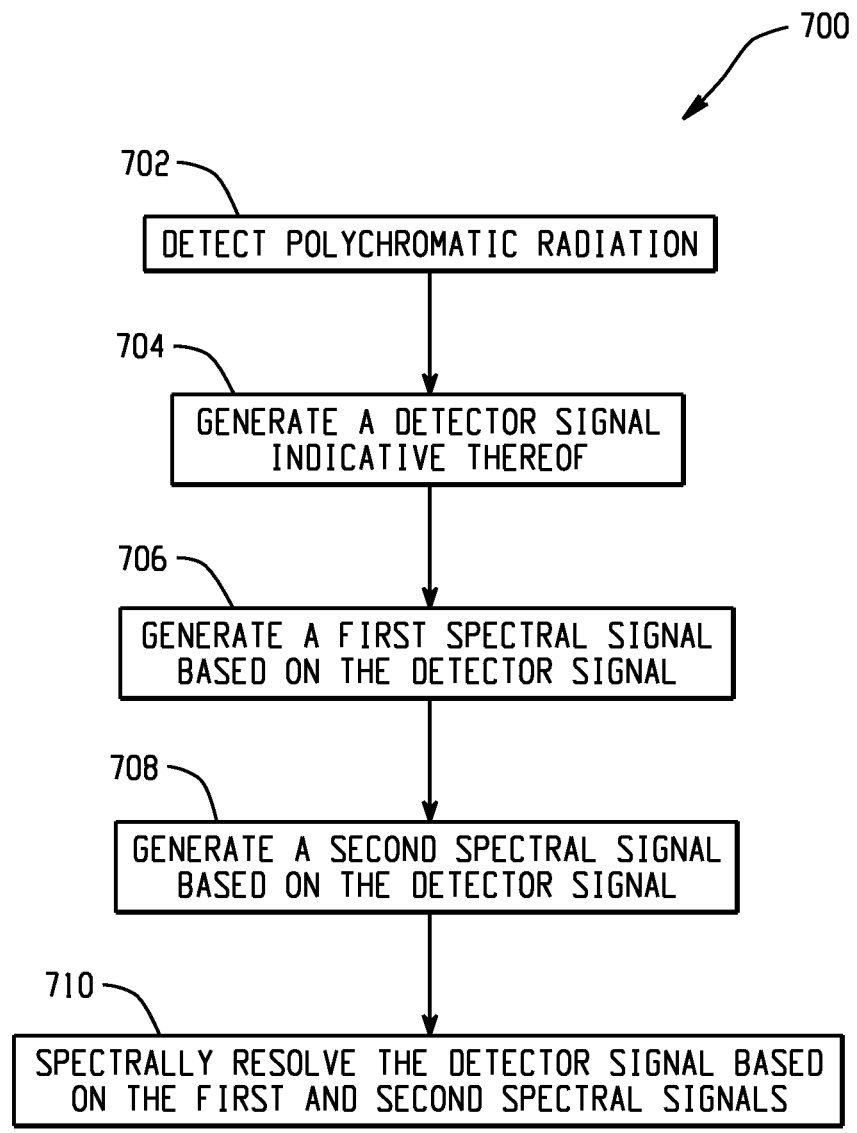

FIG. 1 illustrates an example imaging system.
FIG. 2 illustrates an example spectral processor.
FIGS. 3 and 4 illustrate example spectral detectors.
FIG. 5 illustrates an example imaging system employing kVp switching.
FIG. 6 illustrates an example dual-tube imaging system.
FIG. 7 illustrates an example method.

The following generally relates to concurrently using a detector in both fluctuation mode and current integrating mode. The resulting output signals can be used for dual-energy imaging applications in various fields such as medical, security screening, material analysis, etc. The dual-energy information is provided respectively by the different energy dependencies of fluctuation-mode (AC) signal and the current-integration mode (DC) signal, which respectively are proportional to the mean-square energy and the mean-energy of the x-ray spectrum incident on the detector, respectively. Concurrent detection of the AC and DC components leads to positive noise correlations in the measured samples, which may lead to a relative suppression of basis material noise with respect to the case of uncorrelated (consecutive) measurements.

FIG. 1 illustrates an imaging system 100 such as a computed tomography (CT) scanner. The system 100 includes a generally stationary gantry 102 and a rotating gantry 104. The rotating gantry 104 is rotatably supported by the generally stationary gantry 102 via a bearing or the like.

A radiation source 106, such as an x-ray tube, is supported by the rotating gantry portion 104 and rotates therewith around an examination region 108 about a longitudinal or z-axis 110 and emits polychromatic radiation. A source collimator or the like collimates radiation emitted by the radiation source 106, producing a generally cone, fan, wedge or otherwise-shaped radiation beam that traverse the examination region 108.

A detector array 114 subtends an angular arc opposite the examination region 108 relative to the radiation source 106. The illustrated detector array 114 is a two dimensional array that includes a photosensor array 116 with a scintillator array 112 optically coupled thereto. The scintillator array 112 receives the radiation that traverses the examination region 108 and produces light indicative thereof. The photosensor array 116 receives the light and generates a detector signal such as an electrical current, voltage or other signal indicative thereof.

A processor 118 processes the detector signal from the detector array 114. The illustrated processor 118 includes a plurality processing channels $120_1, \ldots, 120_N$, where N is an integer, collectively referred to herein as processing channels 120. The processing channels 120 independently process the same incoming signal from the detector array 114. As described in greater detail below, in one instance at least two processing channels 120 generate respective signals, which are respectively indicative of different energy information corresponding to the detector signal from the detector array 114.

In the illustrated embodiment, the processor 118 is shown as distinct component of the system 100. In another embodiment, the processor 118 is part of the detector array 114. In yet another embodiment, the processor 118 is located remote from the system. For example, the processor 118 may be part of a separate computing system such as a desktop computer, a workstation, or the like. In addition, an amplifier may be used to amplify the detector signal before processing the detector signal.

A reconstructor 122 reconstructs the signals from the processor 118 and generates volumetric image data. An image generator 124 can be used to generate an image based on the volumetric image data. It is to be appreciated that the signals from the processor 118 can be spectrally resolved in the projection domain and/or the image domain. For example, in one instance a spectral reconstruction, a spectral decomposition, or other spectral algorithm can be used to spectrally resolve the signals in the projection domain. Additionally or alternatively, a conventional reconstruction is performed for each signal, and the signals are spectrally resolved based on the resulting images.

The scanner 100 also includes a couch or patient support 126 that supports a subject, such as a human or animal, or an object within the examination region 108. The support 126 is movable, which enables an operator or the system to suitably position the subject within the examination region 108 before, during and/or after scanning.

A computing system such as an operator console 128 facilitates user interaction with the scanner 100. Software applications executed by the operator console 128 allow the user to configure and/or control operation of the scanner 100. For instance, the user can interact with the operator console 128 to select a spectral or conventional imaging protocol.

As briefly noted above, at least one of the two processing channels 120 generates respective signals, which are indicative of different energy information corresponding to the detector signal from the detector array 114. In one instance, the two processing channels 120 can be configured to generate the respective signals based on a statistical or mathematical model.

By way of example, the mean intensity value and the variance of the incoming electrical detector signal are respectively proportional to the first and second moments of the incident x-ray fluence spectrum. This is shown below in Equations 1 and 2:

$$M_I = k_I \int E\Phi(E)dE, \qquad (1)$$

where $M_I$ is a first measurement signal, indicative of the average photon energy in the x-ray beam, corresponding to the first moment $\int E\Phi(E)dE$ of the x-ray fluence spectrum, $K_I$ is a conversion constant from x-ray intensities to signal current, E is the x-ray energy, and $$M_{II} = k_{II} \int E^2 \Phi(E)dE, \qquad (2)$$

where $M_{II}$ is a second measurement signal, indicative of the average square of the photon energy in the x-ray beam, corresponding to the second moment $\int E^2\Phi(E)dE$ of the x-ray fluence spectrum, and $k_{II}$ is a conversion constant from x-ray intensities squared to signal current.

The two values $M_I$ and $M_{II}$ are well-suited for dual-energy processing application. For example, their noise is strongly correlated as the measurements correspond to the same incoming electrical detector signal. The positive noise correlations can decrease basis image noise. In addition, there are the correlations induced by stochastic fluctuations in the relative signal contributions from the high-energy and low energy spectral domains in the input spectrum. The above and/or other characteristics render the first and second moments well-suited for deriving dual-energy information from a single ray measurement.

FIG. 2 illustrates an example processor 118 that processes the incoming electrical detector signal from the detector array 114 based on Equations 1 and 2. The processor includes two processing channels 120, an ith channel $120_i$ and a jth channel $120_j$, where the ith channel $120_i$ processes the incoming detector signal based on the first moment of the x-ray fluence spectrum or the mean-energy value (see Equation 1) and the jth channel $120_j$ processes the same incoming detector signal based on the second moment of the x-ray fluence spectrum or mean-square energy value (see Equation 2).

A signal router 200 receives an electrical detector signal from the detector array 114 and provides the signal to both the ith and jth channels $120_i$ and $120_j$ of the processor 118. As noted above, generally, the incoming electrical detector signal includes a DC component and an AC component, which contain signal fluctuations that are dependent on the energy of the detected radiation, with lower energy radiation leading to electrical detector signal fluctuations having a smaller magnitude relative to the fluctuations corresponding to higher energy radiation.

The ith channel $120_i$ includes an integrator 202. The integrator 202 integrates the incoming electrical detector signal over the energy spectrum for a predetermined integration period or time period. The integrator 202 outputs a signal indicative of an average or mean intensity value of the incoming electrical detector signal, representing the DC component of the incoming electrical detector signal; the mean intensity value provides first spectral information. However, during the averaging process, spectral information associated with the AC component (e.g., spectral information encoded in the relative fluctuation of the x-ray flux around the measured mean value) is lost.

The jth channel 120 includes a band-pass filter 204, squaring electronics 206 and an integrator 208. The filter 204 filters the incoming electrical detector signal and removes the DC component and low frequency components below the lower cut off frequency from the incoming electrical detector signal as well as frequency components above the upper cut-off frequency.

In one non-limiting instance, the lower cut-off frequency can be used to suppress unwanted signal sources in the fluctuations channel resulting from the scanner rotation and object movements, while the high energy cut-off may be set as close as possible to the highest frequency components induced in the signal by the pulse response. Additionally or alternatively, the lower cut-off frequency can be set to reduce or mitigate noise (e.g., shot noise, thermic noise, etc.) occurring as part of the fluctuation signal. Generally, the total noise level resulting from all sources other than the stochastic incidence of particles in the detector determines the lowest possible flux-rates for which the fluctuation-mode signal will provide useful information.

The squaring electronics 206 outputs the instantaneous squared value of the filtered detector signal. The mean square value provides a statistical measure of the magnitude of the time varying component. The mean square variations of the current fluctuations provide second spectral information. The integrator 202 integrates the squared filtered signal and outputs a signal indicative of the AC component of the incoming electrical detector signal.

As shown, the two signals can be provided to the reconstructor 122. As noted above, in one instance the reconstructor 122 reconstructs the signals based on a conventional reconstruction algorithm. In other words, each signal is reconstructed using a conventional reconstruction algorithm. The resulting volumetric image data can then be used to generate an image for each signal. The signals can then be spectrally resolved via images, using known techniques. In another instance, the reconstructor 122 reconstructs the signals based on a spectral reconstruction algorithm. For example, the reconstruction algorithm may include decomposing the signal to obtain various components in the signals, such as the photo electric component and the Compton component. The image generator 124 (FIG. 1) can then be used to generate images for one or more of these components and/or a composite image including all of the components.

It is to be appreciated that the embodiments described herein can be used in connection with one or more other spectral approaches. For instance, the embodiments described herein can be used in combination with a spectral detector (e.g. a dual-layer system), kVp switching, and/or a multi-tube system. By combining the embodiments described herein with one or more of the techniques and/or other techniques, the spectral separation resolution can be increased.

Examples of such a suitable spectral detector are shown in FIGS. 3 and 4. A scintillator array 302 includes first and second layers of scintillator pixels 304, 306 are stacked in a direction of the incoming radiation. Absorption of the incoming radiation in the scintillator array 302 is energy-dependent, with lower energy photons travelling on average a shorter distance through the scintillator array 302 before being absorbed in the first layer 304, and higher energy photons travelling on average a greater distance through the scintillator array 302 before being absorbed typically in a second layer 306. As such, the depth of the absorption is indicative of the energy of the detected radiation.

As shown in FIG. 3, in one instance the scintillator array 302 is optically coupled on top of a photosensor array 308 having a first photosensitive pixel 310 with a first spectral response tuned to one of the first or second scintillator layers 304, 306 and a second photosensitive pixel 312 with a second spectral response tuned to the other of the first or second scintillator layers 304, 306. In this manner, the photosensor array 308 will have two spectrally different outputs. Using such a detector with the spectral processing described herein, will render four spectrally distinct outputs, or a mean-energy/mean-squared energy signal pair for each of the two spectral responses of the photosensitive pixels 310, 312.

In FIG. 4, the first and second scintillator pixels 304, 306 are respectively optically side-mounted to a photosensor array 402, which includes a first photosensitive pixel 402 with a first spectral response tuned to one of the first or second scintillator layers 304, 306 and a second photosensitive pixel 404 with a second spectral response tuned to the other of the first or second scintillator layers 304, 306. In this manner, the photosensor array 402 will have two spectrally different outputs. A light reflective film or coatings can be placed on the sides of the scintillator pixels 304, 306 not coupled to the photosensor array 402 to direct light towards the photodiode array. Likewise, using such a detector with the spectral processing described herein, will render four spectrally distinct outputs, or a mean-energy/mean-squared energy signal pair for each of the two spectral responses of the photosensitive pixels 310, 312.

With either or both FIGS. 3 and 4, it is to be appreciated that the scintillator pixels 304, 306 can be formed from the same or different emitter materials, and/or the scintillator pixels 304, 306 can have similar or different dimensions, such as similar or different depths in the direction of the incoming radiation. Of course, more scintillator layers and photosensitive pixels can be used in other embodiments.

FIG. 5 illustrates an example of kVp switching. In this example, an x-ray tube controller 502 switches the tube voltage between two (or more) different voltage levels. The controller 502 can switch the tube voltage during a scan (e.g., within a view, between views, etc.), between scans, and/or otherwise, for example, based on scanning information from the console 128. The detector array 114 will generate first signals corresponding to a first tube voltage and second signals corresponding to a second tube voltage. When used in connection with the spectral processing described herein, the system will render four spectrally distinct outputs, or a mean-energy/mean-squared energy signal pair for each of the two tube voltages. By also using the detector of FIGS. 3 and 4, the system will render eight spectrally distinct outputs, or a mean/mean-square pair for each of the two spectral responses of the photosensitive pixels 310, 312, for each of the two tube voltages.

FIG. 6 illustrates an example a multi-tube system 600. For explanatory purposes, the system 600 is shown with two tubes, a first tube/detector pair $106_1/114_1$ and a second tube/detector pair $106_2/114_2$. In other embodiments, the system can be configured with more tube/detector pairs such a three or more tube/detector pairs. In this example, each tube $106_1/$ $106_2$ is operated at a different tube voltage. As a result, each detector $114_1/114_2$ provides an output corresponding to different spectra. When used in connection with the spectral processing described herein, the system will render four spectrally distinct outputs, or a mean-energy/mean-squared energy signal pair for each of the tubes $106_1/106_2$. For each tube/detector pair, a spectral detector and/or kVp switching can be employed to increase the spectral resolution, respectively to eight distinct outputs using the spectral detector of FIGS. 3 and 4, eight distinct outputs using the kVp switching of FIG. 5, and sixteen distinct outputs using both the spectral detector and kVp switching.

In yet another instance, a spectral decomposition algorithm can be used to separate various components such the photoelectric effect component and the Compton effect component. A suitable decomposition is described in Roessl et al., "K-edge imaging in x-ray computed tomography using multi-bin photo counting detectors," Physics in Medicine and Biology, 2007, pages 4679-4696, vol. 52. Another suitable decomposition is described in application serial number PCT/IB2007/055105, filed on Dec. 14, 2007, which claims the benefit of provisional application serial number EP 06126653.2, filed on Dec. 20, 2006. In the latter, the decomposition is extended to derive K-edge components for K-edge materials administered via contrast agents.

Exemplary applications in which the systems and methods described herein can be employed include, but are not limited to, baggage inspection, medical applications, animal imaging, heart scanning, material testing, non-destructive imaging, machine vision, and material science. In addition, applications apply to x-ray CT systems using multiple tubes (and multiple detectors) on a single CT gantry. Other suitable applications include applications where tissue differentiation through higher spectral performance plus the possibility to implement K-edge imaging in a CT system based on current-integrating detectors is desired.

FIG. 7 illustrates a method. At 702, polychromatic radiation is detected. For example, the radiation may correspond to radiation emitted and detected during an imaging procedure such as a CT scan. At 704, a detector signal indicative of the energy of the detected radiation is generated. The detector signal may be an electrical current, an electrical voltage or other signal.

At 706, a first spectral signal is determined derived from the detector signal, wherein the first spectral signal includes first spectral information about the detector signal. As described herein, this may include determining a mean-energy value or the first moment of the x-ray fluence spectrum. At 708, a second spectral signal is determined derived from the detector signal, wherein the second spectral signal includes second spectral information about the detector signal.

As described herein, this may include determining a mean-squared energy value or the second moment of the x-ray fluence spectrum. At 710, the detector signal is spectrally resolved based on the first and second spectral signals. As described herein, the detector signal can be spectrally resolved in the projection and/or image domains.

The processor 118 described herein can be used in various applications, including, but not limited to, CT, x-ray C-arm, baggage inspection, and/or other medical and non-medical imaging applications.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

I claim:

1. A spectral processor that processes a detector signal indicative of polychromatic x-ray radiation detected by an imaging system, comprising:
   a first processing channel that generates a first spectral signal derived from the detector signal, wherein the first spectral signal includes first spectral information about the detector signal and the first spectral signal is generated by computing a first moment of an x-ray fluence spectrum of the polychromatic x-ray radiation encoded in the detector signal; and
   a second processing channel that generates a second spectral signal derived from the same detector signal, wherein the second spectral signal includes second spectral information about the detector signal, wherein the first and second spectral signals are used to spectrally resolve the detector signal.

2. The spectral processor of claim 1, wherein the second spectral signal corresponds to a second moment of an x-ray fluence spectrum of the polychromatic x-ray radiation encoded in the detector signal.

3. The spectral processor of claim 1, wherein the second spectral signal is derived from an AC component of the same detector signal.

4. The spectral processor of claim 1, further including a reconstructor that reconstructs each of the first and second spectral signals and generates first volumetric image data for the first spectral signal and second volumetric image data for the second spectral signal.

5. The spectral processor of claim 4, further including an image generator that generates a first image based on the first volumetric image data and a second image based on the second volumetric image data.

6. The spectral processor of claim 5, wherein the signal is spectrally resolved in the image domain based on the first and second images.

7. The spectral processor of claim 1, further including a reconstructor that employs a spectral algorithm that spectrally resolves the signal in the projection domain.

8. A method, comprising:
   detecting polychromatic radiation traversing an examination region of an imaging system;
   generating a signal indicative of the energy distribution of the detected radiation;
   determining first spectral information about the energy distribution of the radiation from the detector signal;
   determining second spectral information about the energy distribution of the radiation from the detector signal, wherein the first and second information are different, and the second spectral information is determined by computing a mean-squared energy value of energies of x-ray photons of the detected radiation; and
   spectrally resolving the detector signal based on the first and second spectral information.

9. The method of claim 8, wherein the first spectral information corresponds to a mean-energy value of the radiation encoded in the detector signal.

10. The method of claim 8, further comprising:
    band-pass filtering out low and high frequency components of the signal;
    mathematically squaring the filtered detector signal; and
    integrating the squared filtered detector signal, producing the second spectral information.

11. The method of claim 8, further comprising:
computing the first spectral information as an average of a square of energy values of x-ray photons of the detected radiation in the signal.

12. An imaging system, comprising:
a radiation source that emits polychromatic radiation that traverses an examination region:
a detector array that detects the radiation and generates a signal indicative thereof; and
a spectral processor processing the detector signal, the spectral processor, including:
  a first processing channel that generates a first spectral signal derived from the detector signal, wherein the first spectral signal includes first spectral information about the detector signal, and the first processing channel includes an integrator that integrates the detector signal over a certain integration period, thereby generating an integrated signal; and
  a second processing channel that generates a second spectral signal derived from the detector signal, wherein the second spectral signal includes second spectral information about the detector signal,
  wherein the first and second spectral signals are used to spectrally resolve the detector signal.

13. The imaging system of claim 12, wherein the integrated signal represents the DC component of the detector signal.

14. The imaging system of claim 12, wherein the second processing channel includes:
  a band-pass filter that filters out low and high frequency components of the detector signal;
  squaring electronics that mathematically squares the filtered detector signal; and
  an integrator that integrates the squared filtered detector signal.

15. The imaging system of claim 14, wherein the squared filtered signal includes AC components of the signal.

16. The imaging system of claim 12, further including a reconstructor that employs a spectral algorithm to spectrally resolve the detector signal in the projection domain based on the first and second spectral signals.

17. The imaging system of claim 12, further including a reconstructor that reconstructs each of the first and second spectral signals and generates first volumetric image data for the first spectral signal and second volumetric image data for the second spectral signal.

18. The imaging system of claim 17, further including an image generator that generates a first image based on the first volumetric image data and a second image based on the second volumetric image data.

19. The imaging system of claim 18, wherein the signal is spectrally resolved in the image domain based on the first and second images.

20. The imaging system of claim 12, wherein the first spectral signal corresponds to the mean energy value of the radiation encoded in the detector signal and the second spectral signal corresponds to the mean-squared energy value of the radiation encoded in the detector signal.

21. The imaging system of claim 12, wherein the detector array includes a spectral detector that is independently responsive to at least two different energy spectra and that generates at least two different output signals, each corresponding to a different one of the energy spectra, and the first and second processing channels independently process each of the different output signals.

22. The imaging system of claim 12, further including a controller that switches a voltage level of the radiation source between at least two different voltages, wherein the detector array generates a first output signal corresponding to a first radiation source voltage and a second output signal corresponding to a second radiation source voltage, and the first and second processing channels independently process both the first and the second output signals.

23. The imaging system of claim 12, further including at least a second radiation source and a second detector array, wherein each radiation source is operated at a different voltage level, and each detector array generates an output signal corresponding to the corresponding radiation source voltage level, and the first and second processing channels independently process both of the output signals.

24. The spectral processor of claim 12, wherein the second processing channel includes:
  a band-pass filter that filters out low and high frequency components of the detector signal;
  squaring electronics that mathematically squares the filtered detector signal; and
  an integrator that integrates the squared filtered detector signal, producing the second spectral signal.

* * * * *